(12) United States Patent
Birman et al.

(10) Patent No.: US 7,458,695 B2
(45) Date of Patent: Dec. 2, 2008

(54) HIGH LIGHT-EFFICIENCY ILLUMINATION CLUSTER

(75) Inventors: Vyacheslav B. Birman, Auburn Hills, MI (US); Chay Lee, Boca Raton, FL (US); Richard Sanders, Clarkston, MI (US); Christian Tanguy, Rochester, MI (US); Shirley Yu, Troy, MI (US)

(73) Assignee: Continental Automotive Systems US, Inc., Auburn Hills ( * ) Notice: Subject to any disclaimer, the term of this patent is extended or adjusted under 35 U.S.C. 154(b) by 24 days.

(21) Appl. No.: 11/441,773

(22) Filed: May 26, 2006

(65) Prior Publication Data

US 2006/0285308 A1 Dec. 21, 2006

Related U.S. Application Data

(60) Provisional application No. 60/692,193, filed on Jun. 20, 2005.

(51) Int. Cl.
*G01D 11/28* (2006.01)

(52) U.S. Cl. .............. 362/26; 362/27; 362/28; 362/29; 362/30

(58) Field of Classification Search ............. 362/26–30, 362/340, 84
See application file for complete search history.

(56) References Cited

U.S. PATENT DOCUMENTS

| | | | | |
|---|---|---|---|---|
| 4,218,726 A | * | 8/1980 | Fukasawa et al. ............. 362/23 |
| 6,032,608 A | * | 3/2000 | Oreans et al. ................ 116/288 |
| 6,036,327 A | * | 3/2000 | Blonder et al. ............... 362/611 |
| 6,827,460 B2 | * | 12/2004 | Higuchi ........................ 362/609 |
| 6,836,611 B2 | * | 12/2004 | Popovic et al. ............... 385/146 |
| 7,077,535 B2 | * | 7/2006 | Wu ............................... 362/26 |
| 7,159,534 B2 | * | 1/2007 | Tanaka et al. ................ 116/300 |
| 2002/0135994 A1 | * | 9/2002 | Ikarashi et al. ................ 362/23 |
| 2004/0066659 A1 | * | 4/2004 | Mezei et al. .................. 362/555 |
| 2004/0070966 A1 | * | 4/2004 | Ahn et al. ...................... 362/31 |
| 2004/0125585 A1 | * | 7/2004 | Sung ............................ 362/26 |
| 2004/0257790 A1 | | 12/2004 | Tanaka et al. |
| 2005/0002171 A1 | * | 1/2005 | Tanguy et al. ................. 362/23 |
| 2005/0111239 A1 | * | 5/2005 | Hosobuchi ................... 362/617 |
| 2006/0215387 A1 | * | 9/2006 | Wang et al. .................... 362/29 |

FOREIGN PATENT DOCUMENTS

GB 2324599 10/1998

OTHER PUBLICATIONS

International Search Report and Written Opinion mailed Dec. 14, 2006.

* cited by examiner

*Primary Examiner*—Sandra O'Shea
*Assistant Examiner*—Evan Dzierzynski

(57) ABSTRACT

A light guide assembly for illuminating an instrument surface includes a continuous curved transition portion for uniformly directing and transmitting light from a light source to a backlight surface of the instrument surface. The curved shape of the transition portion is tailored to transmit a desired amount of light into the backlight portion and a desired amount outwardly against a back surface of the instrument surface.

6 Claims, 2 Drawing Sheets

HIGH LIGHT-EFFICIENCY ILLUMINATION CLUSTER

CROSS REFERENCE TO RELATED APPLICATION

The application claims priority to U.S. Provisional Application No. 60/692,193 which was filed on Jun. 20, 2005.

BACKGROUND OF THE INVENTION

This invention generally relates to light guide assembly for an illuminated dial. More particularly, this invention relates to a light guide assembly for an illuminated dial that increases light use efficiency.

Conventional illuminated dials utilize a light source such as a light emitting diode (LED) mounted to a circuit board and a light guide device. The light guide device directs light from the mounting location on the circuit board to the surface of the dial. In some applications it is desired to direct light parallel to the surface of the dial to provide the desired aesthetic appearance. Light is therefore directed by way of straight light guide portions connected at a relative angle to each other. The angular connection between straight light guide portions creates an over illuminated point that is not desirable. The over illuminated point or intersection between the straight light guide portions is typically blocked to prevent the over illumination from destroying a desired uniform appearance. For this reason, the angular portion is typically minimized so that the desired uniform lighted surface is available to illuminate more of the gauge.

Blocking light at the intersection points reduces the amount of light available for illuminating the dial gauge. In some instances as much, if not more than 30% of the available light is blocked, thereby reducing the efficiency of the light source and potentially requiring the use of an increased number of light sources, or the use of larger light sources that require more power to obtain the desired illumination.

Accordingly, it is desirable to design and develop a light guide assembly that increases the efficiency of light utilized for illuminating a dial or other instrument device.

SUMMARY OF THE INVENTION

An example light guide assembly for illuminating an instrument surface includes a transition portion for directing and transmitting light from a light source to a back lit surface.

The example light guide assembly includes the curved transition portion that directs light from a light source into a portion of the light guide behind the instrument surface. The transition portion between the light source and the surface behind the instrument surface also transmits a portion of light onto a back side of the instrument surface. The light is utilized to illuminate a further portion of the instrument surface, without the need for additional light sources. The transition portion includes a curved shape that provides a uniform illumination that does not produce over illuminated points that require blocking such that more light is available for illumination purposes.

Accordingly, the light guide assembly includes features that provide for the uniform illumination of an instrument surface and the increased utilization of available light.

These and other features of the present invention can be best understood from the following specification and drawings, the following of which is a brief description.

DETAILED DESCRIPTION OF THE PREFERRED EMBODIMENT

Figure 1:
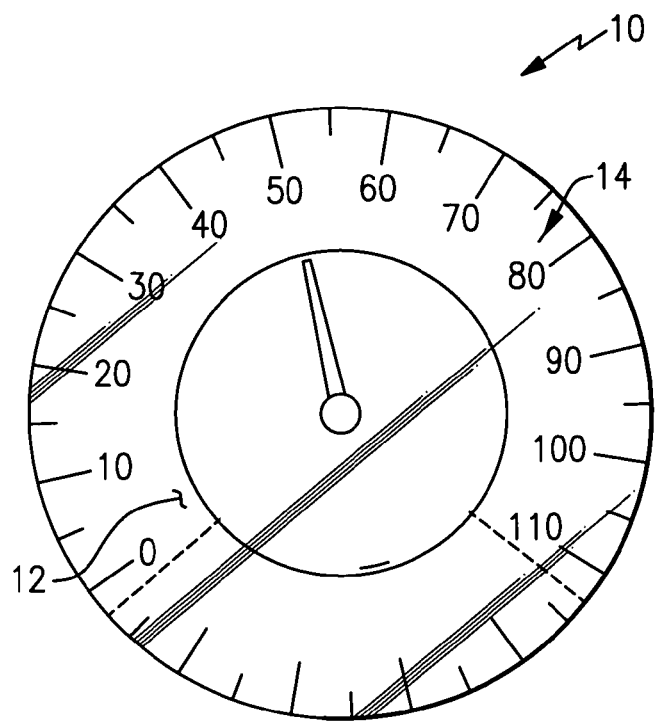
FIG. 1 is a front view of an example illuminated gauge assembly.
Figure 2:
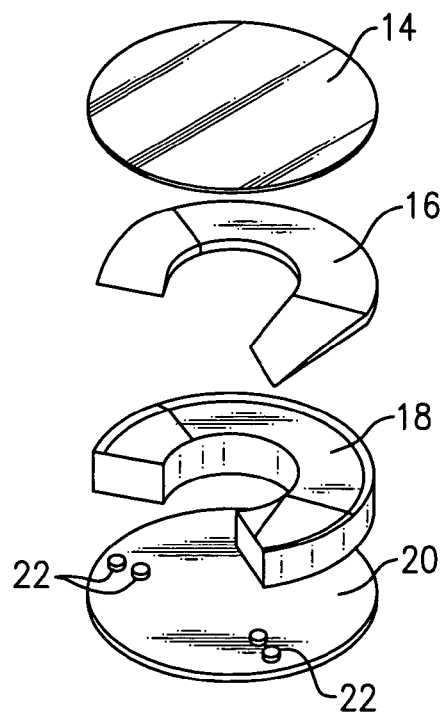
FIG. 2 is an exploded view of the example illuminated gauge assembly.

Referring to FIG. 1, an instrument assembly 10 includes a dial face 14 with a plurality of markings indicating vehicle speed in miles per hour. The dial face 14 is illuminated in a circumferential region indicated at 12. The circumferential region is back lit by way of a light guide 16 (FIG. 2). The back lit region 12 receives light from underneath the dial face 14 to illuminate portions or the entire circumferential region 12. As appreciated, although a round instrument assembly 10 is illustrated and described, other shapes for illuminated instrument cluster assemblies will also benefit from the disclosure of this invention.

Referring to FIG. 2, the instrument assembly 10 is illustrated in an exploded view and includes the light guide 16 mounted within a housing 18. The housing 18 and light guide 16 are in turn mounted to a printed circuit board 20 that includes light emitting diodes (LED) 22. The LEDs 22 emit light that is received and transmitted through the light guide 16.

Figure 3:
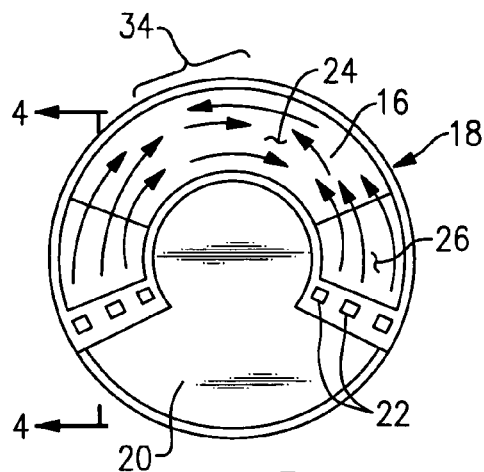
FIG. 3 is a top view of an example light guide assembly.
Figure 4:
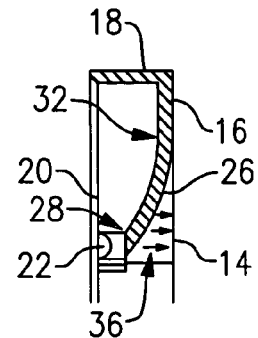
FIG. 4 is a cross-sectional view of the example light guide assembly.

Referring to FIGS. 3 and 4, the light guide 16 receives light from the LEDs 22 through a light receiving surface 28. The light guide 16 includes a transition portion 26 and a backlight portion 24. Light from the LEDs 22 is directed through the light receiving surface 28 through the transition portion into the backlight portion 24. A portion of light 36 within the light guide 16 illuminates the transition portion 26 to provide illumination for a portion of the dial face 14. The remaining portion of light 34 is directed within the light guide 16 to illuminate the backlight portion 24 to provide illumination of the remaining portion of the dial face 14.

The light guide 16 includes a backing 32 that is applied to block the transmission of light through a back side of the light guide 16. The backing 32 can be a coating that is applied to the light guide 16 or a member such as plastic sheet that is attached or assembled within the housing and adjacent the bottom of the light guide to selectively block light.

The light guide 16 is semi-circularly shaped with two ends. At each end is the light receiving surface 28 that is disposed to receive light from the LEDs 22. In the illustrated example, three LEDs 22 are disposed adjacent each light receiving surface 28. The number of LEDs is dependent on desired illumination levels for the instrument assembly 10. More or less LEDs 22 can be utilized to provide the desired intensity of illumination.

Figure 5:
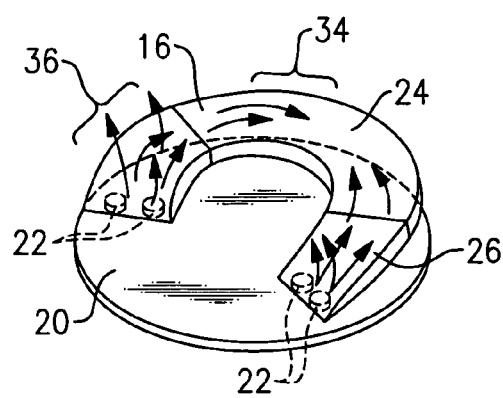
FIG. 5 is a perspective view of the example light guide assembly.

Referring to FIG. 5, the light guide 16 directs light from the circuit board 20 through the curved transition portion 26 to the flat backlight portion 24. The light guide 16 directs light into a plane defined by the backlight portion 24 that is substantially parallel and spaced apart from the circuit board 20. The curved path defined by the transition portion 26 from the LED 22 to the backlight portion 24 transmits a portion of the light 36 upwardly, and directs another portion of light 34 into the backlight portion 24.

Utilizing the light emitted from the transition portion 26 provides a more efficient use of light from the LEDs 22. Instead of blocking light due to over illumination at an intersection point between straight portions, the curved transition portion provides substantially uniform illumination that does not require blocking. Accordingly, more light is available for backlighting the dial face 14. The intensity of the light 36 transmitted through the transition portion 26 is controlled and tailored by adjusting the curvature and arc of the transition portion 26 between the light receiving surface 28 and the backlight portion 24. Further, because the curved transition portion 26 provides uniform illumination along a length, the length of the transition portion 26 can be increased without reducing lighting efficiency.

Figure 6:
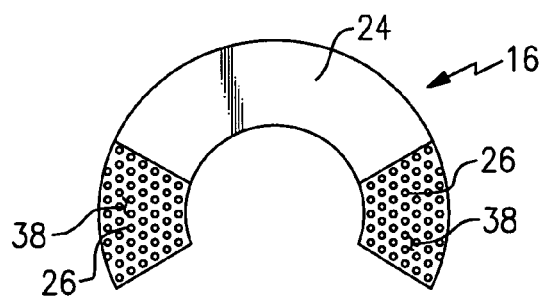
FIG. 6 is a top view of an example light guide.
Figure 7:
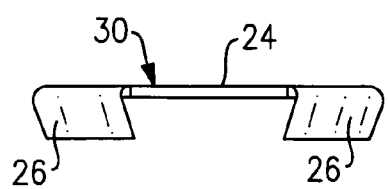
FIG. 7 is a front view of the example light guide.
Figure 8:
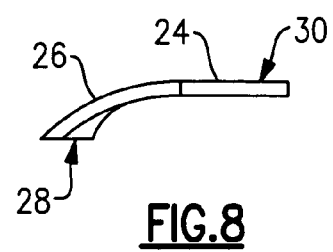
FIG. 8 is a cross-sectional view of the example light guide.

Referring to FIGS. 6, 7 and 8, the light guide 16 includes the curved transition portion 26. The degree and shape of the curved transition portion 26 provides desirable features for the direction and distribution of light. One feature is the substantial elimination of any overly bright points or intersections that provides for use of the transition portion 26 for illuminating the dial face 14. Further, a portion of light entering the light guide is directed through the transition portion 26 to the backlight portion 24 for illumination of a surface 30 that is disposed parallel to the surface to be illuminated, such as the dial face in the illustrated example. The curvature of the transition portion 26 can be modified to tailor the amount and intensity of light that exits the light guide 16 through the transition portion 26 to further illuminate the dial face 14.

The transition portion 26 may also includes a textured surface finish 38 to further tailor the intensity and quality of light emitted through the transition portion 26. The textured surface 38 can provide a desired uniformity in illumination through the transition portion 26.

Accordingly, the example light guide 16 increases the efficient utilization of emitted light by providing a uniform illumination through a transition portion that provides for directing light that would otherwise require blocking through to the back of the dial face. Further, the intensity and uniformity of light transmitted through the light guide transition portion can be modified to tailor the light intensity directed to illuminate the dial face 14.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. An illuminated instrument assembly comprising:
   a dial surface;
   a light source mounted on a circuit board;
   a light guide including a light receiving surface parallel to the dial surface, a back light portion substantially parallel to the dial surface and a transition surface for guiding light from the light source to the back light surface, wherein the transition surface is a continuous surface that transmits light upwardly from the light guide to uniformly illuminate of a portion of the dial surface, wherein the light guide includes a top surface beginning in the transition portion and extending to an end of the back light portion, wherein the entire top surface is open to the transmission of light toward the dial surface; and
   two transition portions and two light receiving surfaces disposed on each end of the back light portion and at least one light source disposed adjacent each of the two light receiving surfaces.

2. The assembly as recited in claim 1, including a light housing for supporting the light guide relative to the light source and the dial surface.

3. The assembly as recited in claim 1, wherein the transition portion directs light from the light receiving surface into the back light portion.

4. The assembly as recited in claim 1, wherein the back light portion includes a surface comprising a texture for distributing light.

5. The assembly as recited in claim 1, wherein the transition portion comprises a curved shape between the light receiving surface and the back light portion.

6. An illuminated instrument assembly comprising:
   a dial surface;
   a light source mounted on a circuit board;
   a light guide including a light receiving surface parallel to the dial surface, a back light portion substantially parallel to the dial surface and a transition surface for guiding light from the light source to the back light surface, wherein the transition surface is a continuous surface that transmits light upwardly from the light guide to uniformly illuminate of a portion of the dial surface, wherein the light guide includes a top surface beginning in the transition portion and extending to an end of the back light portion, wherein the entire top surface is open to the transmission of light toward the dial surface and the light guide and light housing are semi-circularly shaped.

\* \* \* \* \*